(12) United States Patent
Zheng et al.

(10) Patent No.: US 7,344,752 B2
(45) Date of Patent: *Mar. 18, 2008

(54) CORE-SHELL PARTICLES SYNTHESIZED THROUGH CONTROLLED FREE RADICAL POLYMERIZATION

(75) Inventors: Lei Zheng, Apex, NC (US); John Thomas Lean, Akron, OH (US); Eric Sean Castner, Uniontown, OH (US); Thierry Florent Edme Materne, Lasne (BE); Dane Kenton Parker, Massillon, OH (US); Frank James Feher, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/023,868

(22) Filed: Dec. 27, 2004

(65) Prior Publication Data

US 2006/0141150 A1 Jun. 29, 2006

(51) Int. Cl.
*B01J 13/02* (2006.01)
*B01J 13/14* (2006.01)

(52) U.S. Cl. .................. 427/213.3; 264/4.1

(58) Field of Classification Search ............ 427/213.3; 525/571; 526/220; 264/4.1
See application file for complete search history.

(56) References Cited

U.S. PATENT DOCUMENTS

| | | | | |
|---|---|---|---|---|
| 4,814,373 | A * | 3/1989 | Frankel et al. .......... 524/460 |
| 5,395,891 | A | 3/1995 | Obrecht et al. .......... 525/194 |
| 6,127,488 | A | 10/2000 | Obrecht et al. .......... 525/333.3 |
| 6,133,364 | A | 10/2000 | Obrecht et al. .......... 524/495 |
| 6,207,757 | B1 | 3/2001 | Obrecht et al. .......... 525/194 |
| 6,242,526 | B1 * | 6/2001 | Siddiqui et al. .......... 524/555 |
| 6,242,534 | B1 | 6/2001 | Obrecht et al. .......... 525/191 |
| 6,248,419 | B1 | 6/2001 | Kennedy et al. .......... 428/100 |
| 6,353,065 | B1 * | 3/2002 | Charleux et al. .......... 526/220 |
| 6,489,378 | B1 | 12/2002 | Sosa et al. .......... 523/201 |
| 6,653,404 | B2 | 11/2003 | Konno et al. .......... 525/84 |
| 6,747,095 | B2 | 6/2004 | Konno et al. .......... 525/89 |
| 6,777,500 | B2 | 8/2004 | Lean et al. .......... 525/316 |
| 2004/0127634 | A1* | 7/2004 | Parker et al. .......... 524/571 |
| 2005/0282957 | A1* | 12/2005 | Parker et al. .......... 524/565 |

OTHER PUBLICATIONS

U.S. Appl. No. 60/552,617, Zheng et al., filed Mar. 12, 2004.
U.S. Appl. No. 10/721,718, Parket et al., filed Nov. 25, 2002.
Ferguson et al, Polymer magazine, vol. 43, Issue 24 (Nov. 2002), pp. 6371-6382.
Smulders and Monteiro, Macromolecules, 37, 4474-4483 (2004).
Prokopov and Gritskova (*Russ. Chem. Rev* 2001, 70, 791).

* cited by examiner

*Primary Examiner*—Saira B. Haider
(74) *Attorney, Agent, or Firm*—Alvin T. Rockhill

(57) ABSTRACT

The present invention discloses a process for producing a core-shell polymer that comprises: (1) preparing a monomer solution which is comprised of (a) at least one monomer, optional one crosslinking monomer (b) a conjugate acid of a surfactant with a pKa of less than 14, and (c) a controlled free radical polymerization agent; (2) preparing an aqueous medium which is comprised of (a) water, and (b) a conjugate base of a weak acid wherein the pKb of the base is less than 14; and (3) mixing the monomer solution with the aqueous medium under conditions that result in the in-situ formation of an emulsifier to produce a polymerization medium, and (4) initiating free radical polymerization within the polymerization medium to produce a core polymer, wherein the core contains a free radical control agents, (5) adding a second monomer to the polymerization medium containing the core polymer, and (6) allowing polymerization to proceed in the presence of the free radical control agent to produce the core-shell polymer.

20 Claims, No Drawings

CORE-SHELL PARTICLES SYNTHESIZED THROUGH CONTROLLED FREE RADICAL POLYMERIZATION

FIELD OF THE INVENTION

This invention pertains to methods and compositions for controlled polymerization in an emulsion system with a wide variety of monomers to synthesize core-shell polymers. This invention also pertains to methods for producing core-shell type structures in emulsion using controlled radical polymerization. This invention also pertains to methods for producing emulsion systems.

BACKGROUND OF THE INVENTION

Nano-particles are currently receiving significant interest as fillers in rubber compositions. Such combinations often provide dimensions and physical properties that differ from those of the bulk material. The use of nano-particles as fillers is thought to be advantageous because the discrete particles may be more easily and better dispersed in the polymer matrix. The higher surface to volume ratio of the nano-particles provides more opportunities for chemical and physical interactions with the polymer matrix.

The present invention relates to core-shell polymer particles and method for preparing them. The particles can include a crosslinked core and a crosslinked shell, where the shell is covalently connected to the core. The core-shell polymer nano-particles provide a controlled structure, size, and morphology which are useful in composite materials, such as, for example, as fillers in elastomeric polymers. Core-shell particles are widely used for rubber toughened plastics and adhesives.

Incorporation of particles as fillers in rubber compositions is common especially in the tire arts. The fillers are chosen to enhance certain characteristics of the rubber composition. The use of fillers, such as carbon black, silica, and crosslinked polymers, is well known. The addition of fillers tends to improve the physical properties of the polymer matrices to which they are added. Some specific physical properties that are improved by the addition of fillers are tensile strength and wear.

U.S. Pat. Nos. 5,395,891 and 6,127,488 disclose the use of crosslinked polybutadiene and crosslinked styrene-butadiene copolymers respectively as fillers. The purported benefits of the inclusion of these crosslinked polymer particles is lower hysteresis while the polybutadiene gels also impart improved abrasion resistance and the styrene-butadiene copolymer gels offer improve wet traction. U.S. Pat. Nos. 6,133,364, 6,207,757, and 6,242,534 disclose a rubber composition comprising a crosslinked elastomer particle and a non-crosslinked elastomer. The crosslinked elastomeric particles are functionalized to impart unique surface reactivity for improved coupling with the non-crosslinked host elastomer as well as the subsequent ability to employ coupling agents other than the conventional sulfur-bridged bis-alkoxy silanes. The benefits of the gels are reported to be lower hysteresis, improved abrasion resistance, and improved wet traction.

United States Patent Application Serial No. 2002/0007011 and United States Patent Application Serial No. 2001/0053813 to Konno et al disclose a rubber composition comprising as essential components a crosslinked polymer particle and a non-crosslinked rubber component. The rubber composition may be used to obtain a vulcanized rubber. The crosslinked polymer particles are intended for use as filler to provide a rubber composition having good processability and handling performance as well as improved tensile strength and wearing resistance when vulcanized.

Core-shell morphologies from polybutadiene-polystyrene graft copolymers are taught by U.S. Pat. Nos. 6,248,419 and 6,489,378 to Sosa et al. The teaching is directed to production of high impact polystyrene using graft copolymer particles having a polystyrene core occluded inside a polybutadiene shell and the particles have an average particle size of about 0.5 microns.

Nano-particles have also been made using seeded emulsion polymerization technique. Ferguson et al, Polymer magazine, Vol. 43, Issue 24 (November 2002), pages 6371-6382 discloses a process in which particles containing a polystyrene core may be synthesized with a poly(vinyl acetate) shell by emulsion polymerization without secondary particle nucleation in. Ferguson et al focuses on the synthesis of particles with diameters of about 400 nm and only briefly discusses the synthesis of polymer particles with diameters less than 100 nm. Ferguson et al teaches that the emulsion polymerization technique used may produce polystyrene core/poly(vinyl acetate) shell polymer particles where most of the seed particles have diameters of more than 200 nm.

The core-shell polymers of polystyrene and polybutadiene are disclosed in U.S. Pat. No. 6,777,500 to Lean et al. The shell is grafted onto the core through linkage with residual unreacted vinyl groups carried in the core. The core-shell particle can comprise a crosslinked polymer core where the crosslinked polymer core has a predetermined glass transition temperature ($T_g$) such that the crosslinked polymer core does not soften at service temperatures up to about 150° C.

The core-shell particle is also disclosed as a "hairy particle" as described in U.S. Provisional Patent Application Ser. No. 60/552,617, filed on Mar. 12, 2004. The hairy polymer particles can be synthesized by first making a core polymer by emulsion polymerization. After being dried the core polymer is reacted with an organo-lithium compound to make a hairless core initiator. The hairless core initiator can then be used to initiate the anionic polymerization of conjugated diolefin monomers to produce the hairy polymer particles of this invention. The final structured core-shell particle has a crosslinked core and a shell containing linear polymer brushes.

Controlled radical polymerization in emulsion polymerization is particularly attractive for synthesizing core-shell particles with controlled structures, and there is intense worldwide competition in both academic and industrial circles to develop practical emulsion processes. A review of the literature indicates that, in general, conventional emulsion polymerization techniques do not work well for controlled radical polymerization. In many cases the fundamental problems are related to slow initiation coupled with slow transport of the "active" agent or its precursor through the water phase and into the growing polymer particles. In order to circumvent these problems, many groups have used newer techniques for achieving better emulsions and faster rates. The most common technique is "miniemulsion". With this technique, a preformed conventional emulsion of monomer(s), surfactant, a hydrophobe and water is treated under high shear conditions with a homogenizer or ultrasonic horn to prepare much finer, self-stabilized droplets. The fine droplets become the nucleus for polymerization, bypassing the need for transport through the water phase. The two main drawbacks of the miniemulsion technique are: (1) the need for specialized and expensive equipment, and (2) the use of a hydrophobe (e.g., hexadecane), which is undesirable for many potential applications.

A second technique for producing fine droplets is "microemulsion", which typically produces initial monomer droplets in the range of 5 nm and final polymer particles in the range of 30-40 nm. This technique usually requires very large amounts of surfactant, and it rarely is used for controlled polymerization because the amount of surfactant often equals or exceeds the amount of monomer present.

A third technique for achieving controlled emulsion polymerization utilizes a seeding process to initiate polymerization. With this technique, a fraction of the monomer is first mixed with initiator, control agent, water and surfactant. This combination is mixed and allowed to react for a period of time before additional monomer is added. The intent of the first stage is to allow the initiator to form "living" oligomers or "seeds" under conditions where the surfactant-to-monomer ratio is relatively large (i.e., microemulsion). Although this technique has some advantages over miniemulsion because it does not require a hydrophobe or specialized equipment, it does not solve the fundamental problems associated with the use of controlled polymerization technologies in emulsion, such as slow initiation or long reaction times compared to solution reactions. Smulders and Monteiro, Macromolecules, 37, 4474-4483 (2004), recently disclosed a process to obtain core-shell particles using this method.

In assessing this situation, what appears to be necessary for practical emulsion processes based on controlled polymerization technology is a method for: (1) producing stable emulsions without hydrophobes or special equipment; (2) utilizing conventional surfactants and soap levels; (3) effecting rapid initiation and propagation; and (4) achieving complete conversion within a reasonable period of time. This invention pertains to a process to obtain core-shell particles or hairy particles in a practical emulsion polymerization process using controlled radical polymerization.

SUMMARY OF THE INVENTION

The present invention is the result of the discovery that core-shell particle can be prepared by a controlled free radical polymerization technique in emulsion from a variety of monomers, and the resulting particles provide a controlled structure, size, and morphology which are very useful, for example, as fillers in elastomeric polymers to enhance their properties.

The present invention discloses a process for producing a core-shell polymer that comprises: (1) preparing a monomer solution which is comprised of (a) at least one monomer, optional one crosslinking monomer (b) a conjugate acid of a surfactant with a pKa of less than 14, and (c) a controlled free radical polymerization agent; (2) preparing an aqueous medium which is comprised of (a) water, and (b) a conjugate base of a weak acid wherein the pKb of the base is less than 14; and (3) mixing the monomer solution with the aqueous medium under conditions that result in the in-situ formation of an emulsifier to produce a polymerization medium, and (4) initiating free radical polymerization within the polymerization medium to produce a core polymer, wherein the core contains a free radical control agents, (5) adding a second monomer to the polymerization medium containing the core polymer, and (6) allowing polymerization to proceed in the presence of the free radical control agent to produce the core-shell polymer.

DETAILED DESCRIPTION OF THE INVENTION

For purposes of this invention a "core-shell particle" is a multicomponent particle comprising at least two domains, one of which (the core) lies within or is partially engulfed by the other domain forming the polymeric outer layer (the shell). It should be noted that a multicomponent particle is inhomogeneous by virtue of incompatibilities of the component polymers. In any case, the core is typically composed of one single domain of one type of polymer or copolymer that is partially or totally engulfed by the shell of a different incompatible polymer or copolymer.

The core-shell polymers that can be utilized in the practice of this invention are comprised of a polymeric core and a polymeric shell wherein the polymeric core and/or the polymeric shell is crosslinked. In such polymers, the core and the shell can be varied depending upon the desired properties and use of the particles. The core can be a soft or hard polymeric composition and can be a crosslinked polymer having a crosslinked shell. The volume fraction of the core and shell can be varied depending upon the desired final properties of the particles. The shell composition can be chosen to provide compatibility with the matrix composition. The core-shell particle can comprise a crosslinked polymer core where the crosslinked polymer core has a predetermined glass transition temperature ($T_g$) such that the crosslinked polymer core does not soften at service temperatures up to about 150° C.

The core-shell particles are synthesized by a controlled emulsion polymerization which can be a batch, semi-batch, or continuous process, but which provides excellent control of the polymer composition and morphology. Such a process produces particles having a mean average diameter of less than 500 nm, and preferably less than about 200 nm.

Controlled polymerization requires the presence of an agent to control the course of polymerization while minimizing undesirable side reactions, such as chain termination. These agents are called "control agents," and their characteristics depend greatly on the details of the polymerization, including the mechanism for polymerization, the types of monomers being used, the type of initiation, the solvent system, and the reaction conditions. In one embodiment of this invention, the control agent may be a control agent for polymerization by a free radical mechanism, such as reversible-addition fragmentation transfer (RAFT), nitroxide-mediated polymerization (NMP), atom transfer radical polymerization (ATRP) or degenerative transfer (DT). Control agents for related controlled free-radical polymerization processes, such as diphenylethylene (DPE)-mediated polymerization and xanthate-based RAFT (MADIX) or a related mechanism utilize stable free radicals. The control agent may be introduced into the emulsion system by many different methods, and the preferred method depends greatly on the particular embodiment being practiced. In some embodiments, the active control agent may be added directly to the reaction vessel in the form of a pure compound or as a component of a solution or mixture. In other embodiments, the active control agent may be generated in situ from chemical reactions occurring prior to, during or after emulsification.

Regardless of the method used to introduce or generate a control agent, the control agents suitable for the present invention offer one or more of the benefits associated with "living" polymerization kinetics. These benefits may include: (1) a linear dependence of the degree of polymerization as a function of time; (2) a linear dependence of the number-average molecular weight (Mn) on the extent of polymerization; (3) a constant number of polymer molecules and active centers that is sensibly independent of conversion; (4) a narrow molecular weight distribution, with Mw/Mn generally less than 2, preferably between 1.1 and 1.8, and often below 1.4; and (5) essentially complete conversion of monomer to polymer with the ability to continue polymerization upon addition of more monomer.

All polymerization reactions must be initiated. For some monomers, such as styrene, for example, thermal self-initiation can occur without the need for additional reagents. For many other monomers, initiation may be accomplished by adding an agent to trigger one or more chemical reactions that ultimately produces an intermediate capable of propagating polymerization. These agents often are referred to as "initiators."

The type of initiators suitable for the present invention depend greatly on the details of the polymerization, including the mechanism for polymerization, the types of monomers being used, the type of control agent, the solvent system, and the reaction conditions. Many different types of initiators have been investigated.

In some embodiments of this invention, the initiator may be an initiator for polymerization by a free radical mechanism, such as ATRP, NMP, DT, RAFT or a related mechanism involving stable free radicals. Typically, suitable initiators for free radical polymerization are reagents or combinations of reagents that are capable of producing free radicals. Other methods for producing free radicals, including exposure to ionizing radiation ($^{60}$Co γ-rays), photochemical reactions, or sonication, will be evident to those of skill in the art as suitable methods for initiating free radical polymerization.

Some representative examples of free radical initiators that can be used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; and the various alkyl perketals, such as 2,2-bis-(t-butylperoxy)butane, ethyl 3,3-bis(t-butylperoxy)butyrate, 1,1-di-(t-butylperoxy)cyclohexane, and the like. Persulfate initiators, such as potassium persulfate and ammonium persulfate, are especially useful in aqueous emulsion polymerizations.

Polymerization can also be initiated with free radicals that are generated utilizing redox initiators, such as combinations of chelated iron salts, sodium formaldehyde sulfoxylate, and organic hydroperoxides. Some representative examples of such organic hydroperoxides include cumene hydroperoxide, paramenthane hydroperoxide, and tertiary-butyl hydroperoxide. Tertiary-butyl hydroperoxide (t-BHP), tertiary-butyl peracetate (t-BPA) and "azo" initiators, such as azobisisobutyronitrile (AIBN), are preferred for use in generating free radicals.

In batch operations, the polymerization time can be varied as desired; it may vary, for example, from a few minutes to several days. Polymerization in batch processes may be terminated when monomer is no longer absorbed, or earlier, if desired, e.g., if the reaction mixture becomes too viscous.

In continuous operations, the polymerization mixture may be passed through a reactor system of any suitable design. The polymerization reactions in such cases are suitably adjusted by varying the residence time. Residence times vary with the type of reactor system and the size of the reactors, for example, from 10 to 15 minutes to 24 or more hours.

Surfactants are essential for the present invention, and suitable surfactants include any compound or mixture of compounds capable of stabilizing colloidal aqueous emulsions. Generally, surfactants are amphiphilic molecules that reduce the surface tension of liquids, or reduce interfacial tension between two liquids or a liquid and a solid. Surfactants may be small molecules or polymers, micelle-forming or non-micelle-forming, and may be anionic, cationic, zwitterionic or nonionic. In some embodiments of the present invention, mixtures of surfactants are used. The amount of surfactant used typically ranges from about 0.01 to about 200% by weight relative to the monomer, with a more preferred range being from about 0.1 to about 8% by weight and a more specifically preferred range being from about 0.5 to about 3% by weight. Those skilled in the art typically consider a number of factors when selecting surfactants for a particular application, including economic factors.

A broad range of suitable surfactants is described in McCutcheon's Emulsifiers & Detergents Handbook (McCutcheon Division, Manufacturing Confectioner Publishing Co, Glen Rock, N.J., 1999). Suitable anionic surfactants include substituted or unsubstituted hydrocarbyl sulfates, sulfonates, carboxylates, phosphonates and phosphates having between 6 and 30 carbon atoms per anionic functional group. Suitable cationic surfactants include substituted or unsubstituted hydrocarbyl ammonium salts having between 6 and 30 carbon atoms per cationic functional group. Suitable nonionic surfactants include amphiphilic amides having between 6 and 30 carbon atoms for each hydrocarboyl group and between 2 and 30 carbon atoms for each hydrocarbyl amine group. For each surfactant, one or more hydrogen or carbon atom from the hydrocarbyl groups may have replaced with another atom selected from the group consisting of N, S, O, Si, F, Cl, Br and I. The hydrocarbyl may also have one or more hydrogen or carbon atom replaced with a functionality such as a keto, ester, amide, ether, thioether, hydroxyl and the like, and the hydrocarbyl may be part of a ring structure.

In some embodiments, useful surfactants include, for example, alkali metal and ammonium salts of: (i) alkylsulfates (alkyl radical: $C_8$ to $C_{18}$); (ii) alkylarylsulfonic acids (alkyl radical: $C_9$ to $C_{18}$); (iii) alkanesulfonic acids (alkyl radical: $C_8$ to $C_{18}$); (iv) succinate half-amides of alkylamines (alkyl radical: $C_8$ to $C_{18}$); (v) succinate half-esters of alkanols (alkyl radical: $C_8$ to $C_{18}$); (vi) alkanoic acids (alkyl radical: $C_8$ to $C_{18}$); (vii) alkylphosphates (alkyl radical: $C_1$ to $C_{18}$); (viii) alkylphosphonates (alkyl radical: $C_1$ to $C_{18}$); (ix) acylated sarcosine and taurine (acyl radical $C_8$ to $C_{18}$); and (x) sulfosuccinic acid diesters and diamides (alkyl radical: $C_4$ to $C_{18}$). In other embodiments, useful surfactant include, for example: (i) alkanol amides (alkyl radical: $C_2$ to $C_{18}$); (ii) quaternized amines (alkyl radical: $C_1$ to $C_{18}$), including amine oxide derivatives; (iii) quaternized nitrogen-containing heterocycles with pendant alkyls (alkyl radical: $C_4$ to $C_{18}$); (iv) betaine derivatives (alkyl radical: $C_8$ to $C_{18}$); and (v) amphiphilic block copolymers.

An important aspect of the present invention is in-situ emulsification, which is achieved by reacting a "latent surfactant" with a "surfactant activator" to produce the surfactant for controlled emulsion polymerization. As used herein, the term "latent surfactant" refers to a compound or mixture of compounds that: (i) is soluble in a monomer-containing solution that is not miscible with water; and (ii) is not independently capable of producing a stabilized colloidal microemulsion at conventional surfactant levels from simple gentle mixing of the compound or mixture of compounds with monomer-containing solution and water. The term "surfactant activator" is used herein to describe a compound or mixture of compounds that: (i) is soluble in water; and (ii) is not independently capable of producing a stabilized colloidal microemulsion at conventional surfactant levels from simple gentle mixing of the compound or mixture of compounds with monomer-containing solution and water. For the present invention, water can be a reactant for in-situ emulsification reactions, but water alone cannot be the surfactant activator. The use of an in-situ emulsification technique in a controlled polymerization process that can be used in accordance with this invention is described in U.S. patent application Ser. No. 10/721,718, filed on Nov. 25, 2003. The teachings of U.S. patent application Ser. No. 10/721,718 are incorporated herein by reference in their entirety.

The fundamental principles for in-situ microemulsification are described by Prokopov and Gritskova (*Russ. Chem. Rev* 2001, 70, 791), who review its use in conventional free-radical polymerization of styrene using alkali-metal soaps prepared in situ via neutralization of fatty acids. As explained by Prokopov and Gritskova, the preparation of a carboxylate soap at a styrene-water interface during emulsification can produce a fine microemulsion because interfacial tension is decreased significantly by an abundance of emulsifier produced at the interface. By varying the nature of the carboxylic acid and the metal counter-ion used in the surfactant synthesis at the interface, it was possible to control the degree of dispersion and stability of the emulsion, as well as the resulting polystyrene latex produced via conventional free radical polymerization. In the present invention, the principles of in-situ microemulsification are expanded broadly to produce emulsions suitable for controlled polymerization via a wide range of methods utilizing conventional soap levels without added hydrophobes or specialized emulsification equipment.

In some embodiments of this invention, the surfactant for controlled polymerization may be produced by an acid/base neutralization reaction at the monomer/water interface. For some types of anionic surfactants, this may be accomplished, for example, via reaction of a monomer-soluble acid with an aqueous base, where the monomer-soluble acid is the latent surfactant and the base is the surfactant activator for in-situ emulsification. Suitable monomer-soluble acids include, for example, palmitic acid, oleic acid, dodecylbenzene sulfonic acid, lauryl sulfate, hexadecylsulfonic acid, dihexadecylphosphonic acid, hexadecylsuccinate half ester, and the monohexadecylamide of succinic acid. Suitable bases include, for example, hydroxides, carbonates and bicarbonates of alkali metal ions and quaternary ammonium ions, substituted and unsubstituted amines, and basic nitrogen-containing heterocycles. It will be evident to those skilled in the art that any aqueous base with a $pK_b$ less than about the $pK_a$ of the monomer-soluble acid also may be suitable. It also will be evident that hydroxides generated in situ via hydrolysis of moisture-sensitive compounds, such as sodium methoxide, sodium amide, potassium hydride and the like, also may be suitable as surfactant activators.

For some types of cationic surfactants, in situ synthesis during emulsification may be accomplished, for example, via reaction of a monomer-soluble base with an aqueous acid, where the monomer-soluble base is the latent surfactant and the acid is the surfactant activator. Suitable monomer-soluble bases include, for example, hexadecyldimethylamine, hexadecyldimethylamine oxide, and amphiphilic nitrogen-containing heterocycles. Suitable acids include for example mineral acids, sulfonic acids and phosphonic acids. It will be evident to those skilled in the art that any aqueous acid with a $pK_a$ less than about the $pK_b$ of the monomer-soluble base also may be suitable. It also will be evident that acids generated in situ via: hydrolysis of moisture-sensitive compounds, such as Lewis acids, acyl halides, acyl anhydrides, mineral acid anhydrides, hydrolyzable transition-metal halides, main group halides and the like, also may be suitable as surfactant activators.

In one embodiment of this invention, the surfactant may be produced in situ by chemical reactions that attach hydrophilic functionality to a functionalized hydrophobe. For these embodiments, the functionalized hydrophobe is the latent surfactant and the reagent or reagents necessary for attaching the hydrophilic functionality serve as surfactant activator. For some types of surfactants this may be accomplished, for example, via reaction of a monomer-soluble electrophile with an aqueous nucleophile. Suitable electrophiles include for example: (i) hydrocarboyl halides; (ii) hydrocarboyl esters; (iii) hydrocarboyl anhydrides; (iv) hydrocarbyl isocyanates; (v) hydrocarbyl halides; and (vi) hydrocarbyl esters of sulfonic acids. Suitable surfactant activators include for example: (i) amine-functionalized hydrocarbylsulfates, hydrocarbylcarboxylates, hydrocarbylphosphates, hydrocarbylammonium salts; (ii) diethanol amine; (iii) diethylenetriamine and other aminoamines; (iv) amino-polyethyleneglycols and polyethyleneglycol ethers; (v) aminoglycosides; (vi) aminobetaines; (vii) hydroxides of alkali metal ions and quaternary ammonium ions; and (viii) hydrocarbylamines.

For some types of surfactants, in-situ synthesis and emulsification may be accomplished by reaction of a monomer-soluble nucleophile with an aqueous electrophile. Suitable nucleophiles include for example, hexadecylamine and hexadecyldimethylamine. Suitable electrophiles include for example succinic anhydride, dimethylsulfate and 1,3-propanesultone.

Many other reactions can be used to synthesize surfactants in situ, and the specific embodiments illustrated above are not intended to preclude any combination of latent surfactant/surfactant activator that produces a surfactant during emulsification. It will be evident to those skilled in the art that other latent surfactant/surfactant activator combinations may be suitable when the chemistries of surfactant synthesis and controlled polymerization are compatible.

Polymer particles with a core-shell morphology can be prepared from vinyl aromatic monomers and conjugated diolefin monomers by emulsion polymerization techniques. The resulting core-shell polymer nano-particles provide a controlled structure, size, and morphology. The core-shell particles have a generally spherical morphology, which could be described as "golf ball shaped" in that they are more rounded and layered, as contrasted to the "star shaped" particles produced by dispersion polymerization processes. The particles can be a crosslinked or uncrosslinked core and a crosslinked or uncrosslinked shell, and the shell can be grafted to the core with residual unreacted vinyl groups carried in the core. In one embodiment of this invention, both the core and the shell are crosslinked.

The core can be prepared by polymerization of vinyl aromatic monomers, conjugated diene monomers, or a combination of both vinyl aromatic monomers and conjugated diolefin monomers. The monomers selected allow for the tailoring of the core based on the properties of the polymer made. A core made from monomers that result in a polymer with a low Tg will result in a soft core and a core made from monomers that result in a polymer with a high Tg will result in a hard core. The core polymer, optionally, can be crosslinked. By crosslinking the polymer, a harder core and higher temperature stability is achieved. The aromatic vinyl monomers can be chosen from styrene, 2-methylstyrene, 3-methylstyrene, 4-methylstyrene, α-methyl styrene, 2,4-dimethylstyrene, 2,4-diisopropylstyrene, 4-tert-butylstyrene, tert-butoxystyrene, isoprene, and the like, as well as alkyl, cycloalkyl, aryl, alkaryl, and aralkyl derivatives thereof, in which the total number of carbon atoms in the combined hydrocarbon is generally not greater than 18, as well as any di- or tri-vinyl substituted aromatic hydrocarbons. The conjugated diene monomers can be chosen from any emulsion polymerizable conjugated diolefin including 1,3-butadiene, 2,3-dimethyl-1,3-butadiene, isoprene, and other monomers such as methacrylate, methyl methacrylate, vinylchloride, and acrylonitrile. The conjugated diene monomers are present in an amount of about 0% to about 100% by weight based upon the weight of the polymer, while the aromatic vinyl monomers can be present in an amount of about 0% to 100% by weight, preferably about 75% to about 100% by weight, based upon the weight of the polymer.

The core can be crosslinked using a crosslinking monomer (agent) such as divinyl benzene, diisopropenylbenzene, divinylether, triallyl cyanurate, triallyl isocyanurate, 1,2-polybutadiene, ethyleneglycol dimethacrylate, propyleneglycol dimethacrylate, 1,4-butanediol dimethacrylate, 1,6-hexanediol dimethacrylate, trimethylolpropane dimethacrylate, or trimethylolpropane trimethacrylate. The crosslinking monomer is present in an amount of from 0% to about 30%, preferably about 15% to about 30%, by weight based upon the weight of the polymer. Crosslinking the core can increase the hardness of the core, as well as enhance the uniformity and permanence of the shape and size of the resultant nano-particle.

The shell can be comprised totally (100%) of a conjugated diolefin monomer such as 1,3-butadiene, 2,3-dimethyl-1,3-butadiene or isoprene, or can be a copolymer of conjugated diene monomers and aromatic vinyl monomers, such as SBR, such as a random emulsion polymer containing 23.5% by weight bound styrene and 76.5% by weight bound butadiene. The shell is achieved by polymerizing the conjugated diene and/or the vinyl aromatic monomers in the presence of the core particles.

The polymeric particle of the present invention will have a diameter of less than about 500 nm, with particles in the range of less than about 50 nm to 200 nm being preferred, and sizes of less than 100 nm being more preferred. The particles are considered to be spherical, although shape is not critical and shape defects are acceptable, provided the nano-particles retain their discrete nature with little or no polymerization between particles.

One emulsion polymerization technique for synthesizing core-shell polymers that can be utilized in accordance with this invention involves the sequential steps of (1) preparing a monomer solution which is comprised of (a) at least one monomer, optional one crosslinking monomer (b) a conjugate acid of a surfactant with a pKa of less than 14, and (c) a controlled free radical polymerization agent; (2) preparing an aqueous medium which is comprised of (a) water, and (b) a conjugate base of a weak acid wherein the pKb of the base is less than 14; and (3) mixing the monomer solution with the aqueous medium under conditions that result in the in-situ formation of an emulsifier, and (4) initiating free radical polymerization to form core region containing controlling free radical agents, and (5) addition and polymerization of the second monomer, optional one crosslinking monomer, from the point of controlling radical agents to generate shell region. Utilizing this process, it is possible to create a crosslinked polymeric shell wherein the polymeric shell is covalently connected to the polymeric core. Thus, the process can produce nano-particles having core/shell structures and a mean average diameter of less than about 200 nm. The core-shell polymer particles can be recovered separately as reinforcing fillers and blended into the matrix polymer or as suspended particles which are blended with a rubber cement.

The technique of this invention can also be effectively used to produce hairy polymer particles and hairless core initiators as described in U.S. Provisional Patent Application Ser. No. 60/552,617, filed on Mar. 12, 2004. The teachings of U.S. Provisional Patent Application Ser. No. 60/552,617 are incorporated herein by reference in their entirety with respect to the hairy polymer particles and hairless core initiators that can be synthesized using the technique of this invention.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

Polymerization of Crosslinked Polystyrene Seed Particles by RAFT

In this experiment a 2 gallon (7.57 liter) reaction vessel was initially charged with 945.45 grams of styrene, 354.55 grams of divinylbenzene (55%), 78.0 grams of oleic acid and 3.77 grams of dibenzyltrithiocarbonate. The reactor was then flushed with nitrogen, briefly evacuated, and charged with an aqueous solution comprising 5,200 grams of RO water, 3.51 grams of potassium persulfate, 52.0 grams of tripotassium phosphate, and 21.32 grams of potassium hydroxide. A fine microemulsion formed immediately upon mixing the aqueous solution with the organic. The mixture was then rapidly heated to 65° C. (149° F.). Complete conversion to a stable, slightly yellow polystyrene latex was achieved in less than 4 hours. The solids content after stripping was determined to be 21.5%. The particle size was determined by light scattering and fit to a Gaussian distribution. It was determined that the particles had an intensity weight average particle size of 129±65 nm, a volume weight average particle size of 66±33 nm, and a number weight average particle size of 30±15 nm.

EXAMPLE 2

Polymerization of Crosslinked Polybutadiene Seed Particles by RAFT

In this experiment a 2 gallon (7.57 liter) reaction vessel was initially charged with 945.45 grams of 1,3-butadiene, 354.55 grams of divinylbenzene(55%), 78.0 grams of oleic acid, and 2.34 grams of dibenzyltrithiocarbonate. The reactor was charged with an aqueous solution comprising 5,200 grams of RO water, 5.2 grams of potassium persulfate, 52.0 grams of tripotassium phosphate, and 21.32 grams of potassium hydroxide. Immediately upon mixing the aqueous solution with the organic, a fine microemulsion formed. The mixture was then rapidly heated to 65° C. (149° F.). Complete conversion to a stable, slightly yellow polybutadiene latex was achieved in less than 8 hours. The solids content was determined to be 19.5%. The particle size was determined by light scattering and fit to a Gaussian distribution. It was determined that the particles had an intensity weight average particle size of 59±20 μm, a volume weight average particle size of 42±15 μm, and a number weight average particle size of 29±10 nm.

EXAMPLE 3

Polymerization of Crosslinked Polyisoprene Seed Particles by RAFT

In this experiment a 2 gallon (7.57 liter) reaction vessel was initially charged with 945.45 grams of isoprene, 354.55 grams of divinylbenzene (55%), 78.0 grams of oleic acid, and 2.34 grams of dibenzyltrithiocarbonate. The reactor was charged with an aqueous solution comprising 5200 grams of RO water, 5.2 grams of potassium persulfate, 52.0 grams of tripotassium phosphate, and 21.32 grams of potassium hydroxide. Immediately upon mixing the aqueous solution with the organic solution, a fine microemulsion formed. The mixture was then rapidly heated to 65° C. (149° F.). Complete conversion to a stable, slightly yellow polyisoprene latex was achieved in less than 8 hours. The solids content of the latex was determined to be 21.0%. The particle size was determined by light scattering and fit to a Gaussian distribution. It was determined that the particles had an intensity weight average particle size of 59±25 nm, a volume weight average particle size of 34±15 nm, and a number weight average particle size of 20±9 nm.

EXAMPLE 4

Polymerization of Crosslinked Polystyrene Seed Particles with 1,1-Diphenylethylene In this experiment a 2 gallon (7.57 liter) reaction vessel was initially charged with 1285 grams of styrene, 482 grams of divinylbenzene (55%), 106 grams of oleic acid, and 53 grams of diphenylethylene. The reactor was then charged with an aqueous solution comprising 3352 grams of RO water, 69 grams of potassium persulfate, 69 grams of tripotassium phosphate, and 40 grams of potassium hydroxide. Immediately upon mixing the aqueous solution with the organic solution, a fine microemulsion formed. The mixture was then rapidly heated to 65° C. (149° F.). Complete conversion to a stable, slightly yellow polystyrene latex was achieved in less than 4 hours. The solids content was determined to be 37.7%, after being stripping of residue monomers.

EXAMPLE 5

Polymerization of Crosslinked Polystyrene Seed Particles with α,α-(1,4-phenylene)-N-isopropyldinitrone In this experiment a glass quart (0.95 liter) bottle with a rubber septum and Teflon liner was charged with 181.82 grams of styrene, 68.18 grams divinylbenzene (55%), 15.0 grams of oleic acid, and 2.65 grams of α,α-(1,4-phenylene)-N-isopropyldinitrone. Then an aqueous solution comprising 500 grams of RO water, 11.9 grams of potassium persulfate, 11.9 grams of tripotassium phosphate, and 4.5 grams of potassium hydroxide was added to the bottle. Immediately upon mixing the aqueous solution with the organic solution, a fine microemulsion formed. The bottle was purged with nitrogen gas for 3 minutes to remove oxygen and was sealed. The sealed bottle was placed in a 65° C. (149° F.) water bath and rotated at 20 revolutions per minute. The reaction was allowed to proceed until the solids content reached a plateau of 33.9% solids.

EXAMPLE 6

Synthesis of Core-Shell Particles of Crosslinked Polybutadiene Core and Polystyrene Shell by RAFT (PBd/PS=1/1)

In this experiment a glass quart (0.95 liter) bottle with a rubber septum and Teflon liner was charged with 359 grams of the polybutadiene seed latex made in Example 2 having a 19.5% solids content, 271 grams of RO water, and 70.0 grams of styrene. The bottle was purged with nitrogen gas for 5 minutes to remove oxygen and was then sealed. The sealed bottle was placed in a 65° C. (149° F.) water bath and rotated at 20 revolutions per minute. The reaction was allowed to proceed until the solids content reached a plateau of 20% solids. The particle size was determined by light scattering and fit to a Gaussian distribution. It was determined that the particles had an intensity weight average particle size of 71±21 nm, a volume weight average particle size of 54±16 nm, and a number weight average particle size of 41±12 nm. To obtain TEM images of core-shell particles, samples were taken at the end of the polymerization and further diluted with water to about 0.1 weight percent, then deposited onto a TEM grid. The samples were stained with osmium tetroxide before imaging, which preferentially reacted with the polybutadiene component of the particle. The images attained showed the core-shell particle structure.

EXAMPLE 7

Synthesis of Core-Shell Particles of Crosslinked Polyisoprene Core and Polystyrene Shell by RAFT (PI/PS=1/1)

In this experiment a glass quart (0.95 liter) bottle with a rubber septum and Teflon liner was charged with 334 grams of the polyisoprene seed latex made in Example 3 having a 21.0% solids content, 296 grams of RO water, and 70.0 grams of styrene. The bottle was purged with nitrogen gas for 5 minutes to remove oxygen and was sealed. The sealed bottle was placed in a 65° C. (149° F.) water bath and rotated at 20 revolutions per minute. The reaction was allowed to proceed until the solids content reached a plateau of 20% solids. The particle size was determined by light scattering and fit to a Gaussian distribution. It was determined that the particles had an intensity weight average particle size of 67±24 nm, a volume weight average particle size of 46±17 nm, and a number weight average particle size of 31±11 nm.

EXAMPLE 8

Synthesis of Core-Shell Particles of Crosslinked Polystyrene Core and Polyisoprene Shell by RAFT (PS/PI=1/1)

In this experiment a glass quart (0.95 liter) bottle with a rubber septum and Teflon liner was charged with 465 grams of the polystyrene seed latex made in Example 1 (21.5% solids content), 300 grams of RO water, and 100 grams of styrene. The bottle was purged with nitrogen gas for 3 minutes to remove oxygen and was sealed. The sealed bottle was placed in a 65° C. (149° F.) water bath and rotated at 20 revolutions per minute. The reaction was allowed to proceed until the solids content reached a plateau. The final solids content was 17.8% (57% conversion of isoprene) and the ratio of polystyrene to polyisoprene was 100:57.

EXAMPLE 9

Synthesis of Core-Shell Particles of Uncrosslinked Polystyrene Core and Poly(methyl methacrylate) Shell by RAFT (PS/PMMA=1/1)

This experiment was conducted to illustrate the controlled nature of the polymerization in terms of molecular weight and molecular weight distribution. In the procedure used an 8 ounce (236.59 ml) glass bottle with a rubber septum and Teflon liner was charged with 25 grams of styrene, 1.5 grams of oleic acid, and 0.07 grams of dibenzyltrithiocarbonate. The bottle was charged with an aqueous solution comprising 100 grams of RO water, 0.07 grams of potassium persulfate, 1.0 grams of tripotassium phosphate, and 0.41 grams of potassium hydroxide. Immediately upon mixing the aqueous solution with the organic solution, a fine microemulsion formed. The bottle was purged with nitrogen gas for 5 minutes to remove oxygen and was sealed. The sealed bottle was placed in a 65° C. (149° F.) water bath and rotated at 20 revolutions per minute. Complete conversion to a stable, polystyrene latex was achieved in about 3 hours. The solids content was determined to be 19%. GPC analysis of the polymer gave showed a number average molecular weight (Mn) of 106,000 with a polydispersity (PDI) of 1.19, using a Wyatt light scattering detector with a dn/dc value of 0.185.

The bottle was subsequently charged with 75 grams of RO water and 25 grams of methyl methacrylate monomer. The bottle was purged with nitrogen gas for 5 minutes to remove oxygen and was then sealed. The sealed bottle was placed in a 65° C. (149° F.) water bath and rotated at 20 revolutions per minute. The reaction was allowed to proceed until the solids content reached a plateau of 21% solids in 4 hours. A latex of polystyrene core and poly(methyl methacrylate) shell was formed. GPC analysis of the polymer showed a number average molecular weight (Mn) of 177,000 with a PDI of 1.21 (using a Wyatt light scattering detector with a dn/dc value of 0.133).

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which would be within the full-intended scope of the invention as defined by the following appended claims.

What is claimed is:

1. A process for producing a core-shell polymer that comprises: (1) preparing a monomer solution which is comprised of (a) a first monomer, (b) a conjugate acid of a surfactant with a pKa of less than 14, and (c) a controlled free radical polymerization agent; (2) preparing an aqueous medium which is comprised of (a) water, and (b) a conjugate base of a weak acid wherein the pKb of the base is less than 14, and (3) mixing the monomer solution with the aqueous medium under conditions that result in the in-situ formation of an emulsifier to produce a polymerization medium, (4) initiating free radical polymerization within the polymerization medium in the presence of a free radical control agents to produce a solution of polymeric particles, (5) adding a second monomer to the solution of polymeric particles, and (6) allowing polymerization to proceed in the presence of the free radical control agent to produce the polymer, wherein the core-shell polymer includes a core which is comprised of repeat units of the first monomer and a shell which is comprised of repeat units of the second monomer, wherein the core is at least partially engulfed by the shell, wherein the core is a crosslinked polymer core, wherein the crosslinked polymer core has a glass transition temperature such that the crosslinked polymer core does not soften at service temperatures up to about 150° C., and wherein the core is incompatible with the shell.

2. A process as specified in claim 1 wherein the monomer solution is further comprised of a crosslinking agent.

3. A process as specified in claim 1 wherein the monomer utilized in step (1) is a mixture of 1,3-butadiene and styrene.

4. A process as specified in claim 1 which further comprised adding a crosslinking agent to the monomer solution of step (1).

5. A process as specified in claim 1 which further comprised adding a crosslinking agent to the solution of polymer particles in step (5).

6. A process as specified in claim 1 which further comprised adding a crosslinking agent to the monomer solution of step (1); and which further comprised adding additional crosslinking agent to the solution of polymer particles in step (5).

7. A process as specified in claim 1 wherein the second monomer is added continuously in step (5) over period of at least 15 minutes.

8. A process as specified in claim 1 wherein the core-shell polymer is in the form of particles having a mean diameter of less than 500 nm.

9. A process as specified in claim 1 wherein the core-shell polymer is in the form of particles having a mean diameter of less than 200 nm.

10. An emulsion polymerization process for producing a core-shell polymer composition that comprises: (1) preparing a aqueous polymerization medium which is comprised of (a) at least one first monomer, (b) a polymerization control agent, and an emulsifier, wherein the emulsifier is prepared in-situ within the aqueous polymerization medium by the reaction of a latent surfactant with a surfactant activator; (2) initiating polymerization of said monomer within the aqueous polymerization medium to produce polymer particles; (3) adding a second monomer to the aqueous polymerization medium containing the polymer particles; and (4) allowing the polymerization to proceed in the presence of the free radical control agent to produce the core-shell polymer composition, wherein the core-shell polymer includes a core which is comprised of repeat units of the first monomer and a shell which is comprised of repeat units of the second monomer, wherein the core is at least partially engulfed by the shell, wherein the core is a crosslinked polymer core, wherein the crosslinked polymer core has a glass transition temperature such that the crosslinked polymer core does not soften at service temperatures up to about 150° C., and wherein the core is incompatible with the shell.

11. An emulsion polymerization process as specified in claim 10 wherein the latent surfactant is a conjugated acid of an anionic surfactant, wherein the $pK_a$ of the acid is less than about 18.

12. An emulsion polymerization process as specified in claim 10 wherein the latent surfactant is a conjugated base of an anionic surfactant, wherein the $pK_b$ of the base is less than about 14.

13. An emulsion polymerization process as specified in claim 10 wherein the polymer composition is comprised of hairy polymer particles which are comprised of (i) a core which is comprised of a polymer of a vinyl aromatic monomer and (ii) hairs which are comprised of polymer chains of a conjugated diolefin monomer, wherein the hairs are covalently bonded to the core.

14. An emulsion polymerization process as specified in claim 10 which further comprised adding a crosslinking agent to the aqueous polymerization medium made in step (1).

15. An emulsion polymerization process as specified in claim 10 which further comprised adding a crosslinking agent in step (3) to the aqueous polymerization medium containing the polymer particles.

16. An emulsion polymerization process as specified in claim 10 which further comprised adding a crosslinking agent to the aqueous polymerization medium made in step (1); and which further comprised adding a crosslinking agent in step (3) to the aqueous polymerization medium containing the polymer particles.

17. An emulsion polymerization process as specified in claim 10 wherein the monomer added in step (1) is a conjugated diolefin monomer.

18. An emulsion polymerization process as specified in claim 17 wherein the conjugated diolefin monomer is selected from the group consisting of 1,3-butadiene and isoprene.

19. An emulsion polymerization process as specified in claim 18 wherein the monomer added in step (1) further comprised a vinyl aromatic monomer.

20. An emulsion polymerization process as specified in claim 19 wherein the vinyl aromatic monomer is styrene.

* * * * *